UNITED STATES PATENT OFFICE.

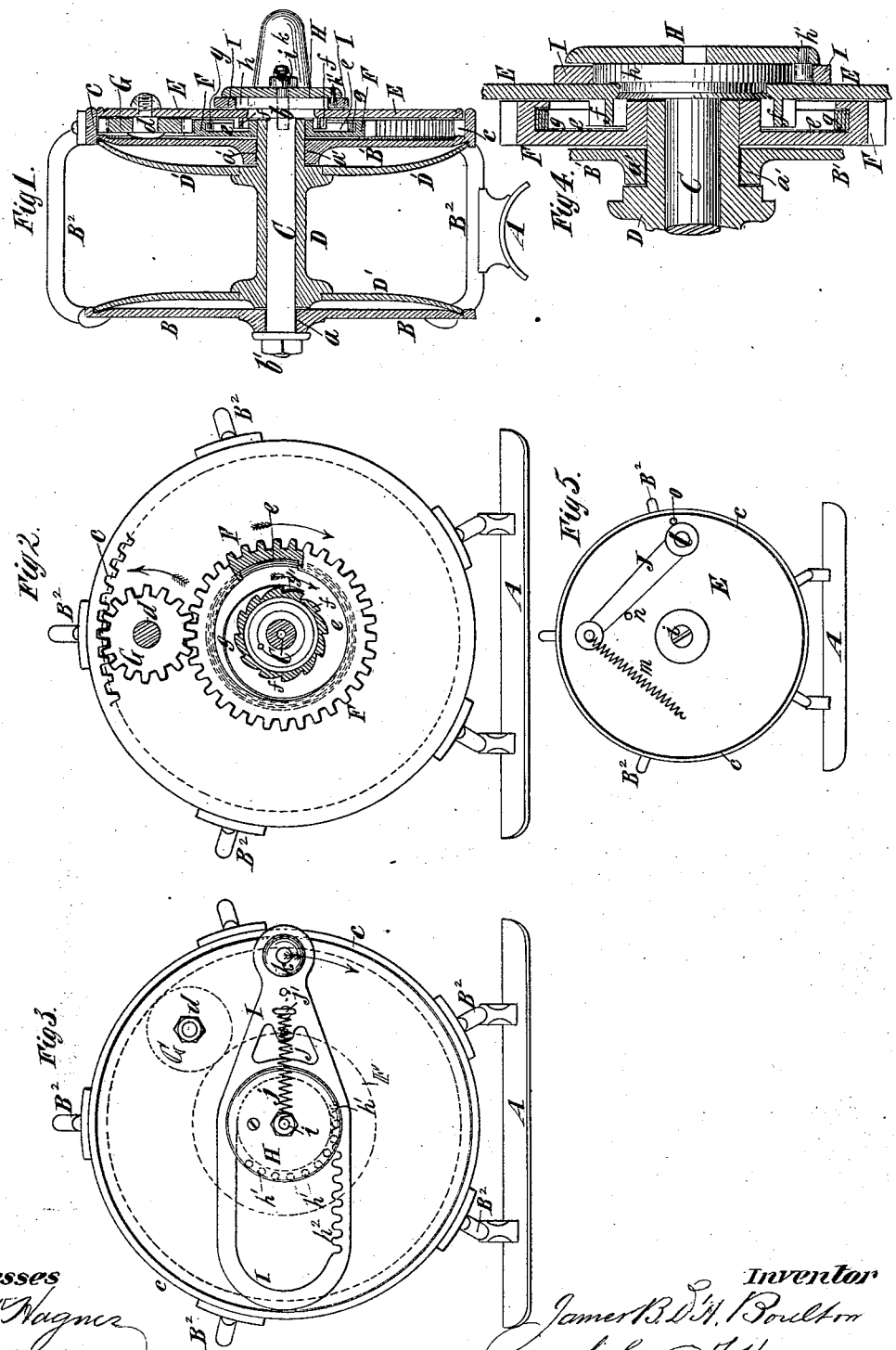

JAMES B. D'A. BOULTON, OF JERSEY CITY, N. J., ASSIGNOR TO WILLIAM MILLS AND THOMAS BATE MILLS, OF NEW YORK, N. Y.

FISHING-REEL.

SPECIFICATION forming part of Letters Patent No. 260,932, dated July 11, 1882.

Application filed December 31, 1881. (Model.)

*To all whom it may concern:*

Be it known that I, JAMES B. D'ARCY BOULTON, of Jersey City, in the county of Hudson and State of New Jersey, have invented certain new and useful Improvements in Fishing-Reels, of which the following is a specification.

My invention relates to multiplying-reels in which the spool of the reel is rotated at a quicker speed than the handle or crank whereby the reel is operated.

The invention consists in the combin with the spool and frame of a reel, of a non-rotary internally-toothed stationary ring attached to the frame of the reel, a spur-wheel upon the spool of the reel, and a pinion engaging with said ring and wheel, and adapted to be revolved round said wheel, and at the same time rotated on its axis by reason of its engagement with said non-rotary ring, whereby I provide a reel in which the handle and spool are moved in the same direction, the latter being rotated at a much quicker speed than the former. The wheel, the pinion, and the internal gear are all in the same plane, and the pinion may be pivoted on the inner side of the handle-plate which covers the gearing.

The invention also consists in the combination, with the spool, of a stop of novel construction, which serves as a friction brake or drag when required.

In the accompanying drawings, Figure 1 represents a longitudinal section of a reel embodying my invention, taken on the plane of the axis or spindle. Fig. 2 represents a side view thereof, with the handle-plate removed and certain parts shown in section. Fig. 3 represents an outside view of the reel, showing its operating-handle. Fig. 4 represents a detail sectional view of a portion of the reel on a larger scale than Fig. 1 and in the same plane; and Fig. 5 represents a side view of a reel having its operating-handle of modified construction and arrangement.

Similar letters of reference designate corresponding parts in all the figures.

Referring first to all the figures except Fig. 5, A designates the curved plate, which is adapted to fit upon the fishing-rod, and B B' designate the two fixed cheeks, which are united by curved bars $B^2$, and form with said bars the frame of the reel. Where the two cheeks are connected by straight rods or pins, as is frequently the case, the cheeks must be large enough in diameter to receive the rods or pins, and hence are larger than the coil on the reel ever is. Where the curved arms $B^2$ are used to connect the two cheeks they may be smaller in diameter.

C designates the axis, pin, or spindle, which is fitted and adapted to turn in a bearing, $a$, in the back or left-hand cheek, B, and which has a head, $b$, at one end and a nut, $b'$, for securing it in place, at the other end.

D designates the hub of the spool, which fits loosely and is adapted to turn freely on and independently of the pin or spindle C, and D' designates the heads of the spool.

E designates a handle-plate, which is fixed on the head $b$ of the pin or spindle C, and is adapted to rotate with said pin or spindle.

The front or right-hand cheek, B', has an outwardly-projecting rim, $c$, at its periphery, which is provided with teeth, and constitutes a non-rotary internal gear or circular rack, as seen in Fig. 2. For convenience in cutting the teeth of the rim $c$, the latter may be made in the form of a ring separate from the cheek, and after the teeth are cut the ring may be slipped over the cheek B' and soldered thereto, as clearly shown in Fig. 1. The handle-plate E then fits snugly in the rim $c$ and precludes the entrance of dirt and dust.

The hub D of the spool is prolonged so as to form a journal, which fits in a bearing, $a'$, in the front or right-hand cheek, B', and which projects beyond the said bearing sufficiently to receive a wheel, F, which is fixed to the journal, and is in the same plane as the circular rim or rack $c$.

G designates a pinion adapted to rotate freely upon a pin or stud, $d$, projecting from the inner face of the handle-plate E, and said pinion engages with the wheel F and with the toothed rim $c$ of the cheek B'. It will therefore be seen that by turning the handle-plate the pinion G will be revolved around the wheel F, and by reason of its engagement therewith and with the rim $c$ will cause the pinion G to rotate upon its axis. Hence the spool D, to which the wheel F is secured, will be rotated in the same direction as the handle-plate E, but at an accelerated speed. The wheel F has an annular recess, $e$, in its outer side, as shown clearly in Figs. 1 and 4, forming a friction-box, and upon the inner face of the handle-plate E is a ratchet-wheel, $f$, which may consist simply of a ring cast on or attached to said plate, as here shown.

In the friction-box is arranged a coiled spring, $g$, (best shown in Fig. 2,) and provided at its inner end with a pawl or tooth, $g'$, which rides upon the ratchet-wheel $f$. The spring has a constant tendency to uncoil, which causes it to tightly hug the inside of the friction-box $e$. In winding up both the wheel F and the ratchet-wheel $f$ turn in the direction of the arrows shown in Fig. 2; but the wheel F turns faster than the ratchet-wheel, and consequently the pawl or tooth $g'$ rides freely over the teeth of the ratchet-wheel $f$. When it is desired to let the line run out, as when a fish is hooked, the tooth or pawl $g'$ takes into the teeth of the ratchet-wheel $f$, and the spring $g$ is thereby caused to coil up slightly, allowing the wheel F to slip upon it, and therefore the spring exerts sufficient frictional resistance to the turning of the wheel F to serve as a brake or drag.

The ratchet $f$, instead of being permanently secured to the handle-plate, may be loose and locked to the plate, when desired, by a pin or bolt inserted through them both, and when the pin or bolt is withdrawn the spool would be free to turn either way without being impeded by the frictional resistance of the spring.

In lieu of having the ratchet-wheel $f$ secured to the handle-plate E and the spring $g$ in the wheel F, a separate friction-box containing the spring might be mounted on the opposite end of the spool-hub D and the ratchet-wheel $f$ attached to that end of the spindle or pin C; or the ratchet-wheel might be on the spool and the friction-box in the handle-plate.

To the head of the pin C a cap-plate, H, of larger diameter, is secured by a screw, $i$, or otherwise, thus forming an annular rabbet or recess, $h$, between the head of the pin and said cap-plate.

I designates a lever or handle, which is bifurcated or open at the center, so as to fit and slide freely in the rabbet or recess $h$. In the annular rabbet or recess $h$, for a portion of its circumference, are pins $h'$, which form teeth, and with which a rack, $h^2$, cut in one side of the lever or handle I, engages, as seen clearly in Fig. 3. When not otherwise actuated, the lever or handle I is drawn inward to the position shown in Fig. 3 by a spring, $j$, one end of which is attached to the cap or disk H or screws $i$ and the other end to the pin $j'$ in the handle; and to enable the tension of the spring to be varied the said pin may be inserted in any one of the several holes in the handle, which are shown in Fig. 3. When the reel is to be turned to wind up the line the knob $k$ of the handle I is operated in the direction of the arrow, Fig. 3. The lever or handle I will turn on the cap or disk H, and its teeth, engaging with the pins $h'$, will cause the lever or handle to be extended and to stretch the spring $j$. This will continue until the resistance of the spring to further extension more than equals the pull on the line multiplied by the proportion of gearing, when the handle or lever will turn the cap or disk H and pin C, and through them the handle-plate E, to operate the reel.

If the resistance on the line is very great, the spring $j$ may not have an equal resistance, even when fully extended, and in such case the side of the lever or handle I opposite the rack $h^2$ will strike against the first pin, $h'$, on the cap or disk H and turn the latter, as it is prevented by the pins from turning round freely in the rabbet. When the handle or lever I is released it will be drawn in by the spring $j$, so that it will not project beyond the periphery of the cheeks on the reel to any extent.

The extensible handle I is not here claimed, but may be made the subject of a future application for Letters Patent.

In Fig. 5 I have represented a lever or handle, J, as pivoted at $l$ to the handle-plate E, and it has its free end connected by a spring, $m$, with the handle-plate. When not operated the lever J rests against the stop-pin $n$, and when the lever is operated it simply extends the spring $m$ until its resistance equals the resistance on the line, when the further operation of the lever will turn the handle-plate. If the resistance on the line is very great, the spring will extend until the lever strikes the stop-pin $o$, when its further operation will turn the handle-plate. When released the spring will return the lever, so that it will not project beyond the periphery of the reel.

The construction shown in Fig. 5 is not here claimed, but may be made the subject of a future application for Letters Patent.

Although I have only shown my improved handle and the friction-brake or drag in connection with my improved mechanism for rotating the spool on the reel, it is obvious that they may be used for rotating the spool and retarding the unwinding of the line on any reel.

I am aware that a reel has been heretofore made in which the rotary motion is imparted to the spool by an outer rotary internal gear to which the handle is attached and an intermediate wheel mounted on a fixed pivot and engaging both with said internal gear and the wheel upon the spool shaft or arbor. This reel I do not claim as of my invention, and my reel differs from it in that my internal gear is fixed instead of rotary, and my intermediate wheel, instead of being mounted on a fixed pivot, is mounted on a movable pivot, so that it may be revolved around the wheel on the spool arbor or shaft, and at the same time rotate on its pivot. The advantages resulting from this difference in construction are various. In the old reel the multiplied rotations of the spool are all transmitted through the rotation of the wheels on their axes, and hence the friction of the gear-teeth is greater than in mine, where one rotation of the spool is due to the revolving motion of the intermediate wheel around the wheel on the spool shaft or arbor. It is necessary in a multiple reel that the handle should always be made to turn toward the right, or "in the right direction," as it is termed, and no fisherman would like to use a reel in which the handle was intended to be turned toward the left. In my reel, when the handle is turned to the right the spool will be turned in the same direction; but if the handle of the old reel be turned to the right the spool will be turned to the left, or in a reverse direction, and the line, instead of being carried to the under side of the spool, as in my reel, must be carried to the upper side of the spool and several inches away from the rod. The carrying of the line to the upper side of the spool and away from the rod is a serious disadvantage, as the hand must hold the rod in advance of the reel, and the line would make a considerable angle at the hand or through an eye on the rod, and would be apt to cut the hand, or else rapidly wear itself out in the eye. With my reel the line follows the rod clear up to the reel and winds on the under side of the spool, and any experienced fisherman will at once appreciate the desirability of a construction which will admit of this.

What I claim as my invention, and desire to secure by Letters Patent, is—

1. The combination, with the frame and spool of a reel, of a non-rotary internally-toothed ring attached to the frame, a spur-wheel upon the spool, and a pinion engaging with said ring and wheel and adapted to be revolved around said wheel and between it and said ring and rotated on its axis by engagement with said ring, substantially as and for the purpose described.

2. The combination, with the frame and spool of a reel, of a non-rotary internally-toothed ring attached to the frame, a spur-wheel upon the spool, a rotary handle-plate, and a pinion pivoted to the handle-plate and engaging with said wheel and toothed ring and adapted to be revolved around said wheel, and at the same time rotated on its axis by reason of its engagement with said ring, substantially as described.

3. The combination, with the spool of a multiplying-reel and a handle geared therewith to rotate slower than said spool, of a ratchet-wheel, a coiled spring having an attached pawl or tooth engaging with said ratchet-wheel, and a friction-box containing said spring, the said box, spring, pawl, and ratchet-wheel being interposed between said spool and handle, and the whole being and operating substantially as described.

4. The combination, with the spool of a multiplying-reel, of a wheel adapted to rotate therewith and having in it a friction-box, a ratchet-wheel adapted to rotate in the same direction, but at a slower speed than said spool, and a spring coiled in said friction-box, and having at its inner end a pawl or tooth for engaging with said ratchet-wheel, substantially as described.

JAS. B. D'A. BOULTON.

Witnesses:
   FREDK. HAYNES,
   ED MORAN.